Aug. 3, 1943.  T. HIGGINS  2,325,955
INSULATED MILK BOTTLE COVER
Filed Aug. 5, 1941
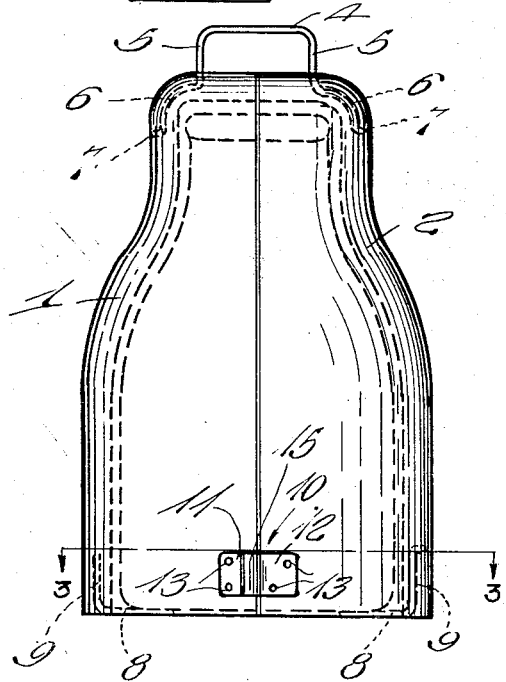
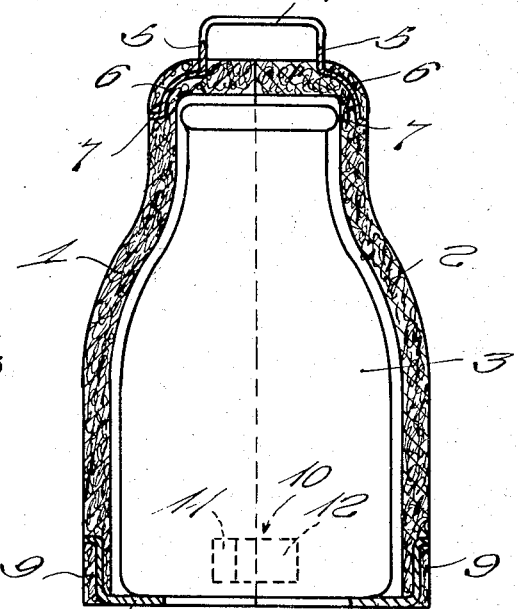
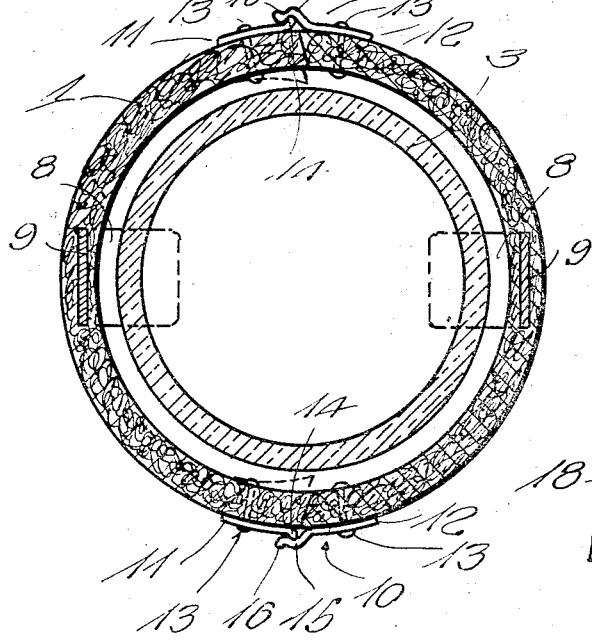
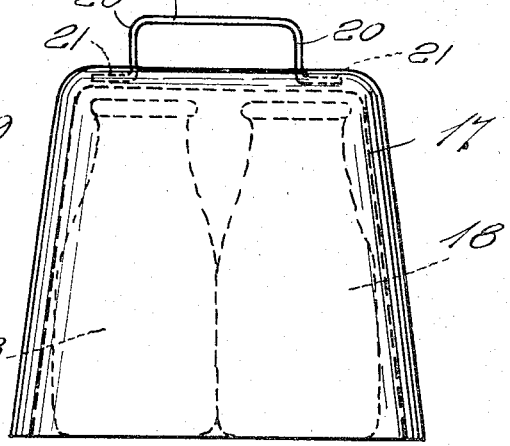
Inventor
THilda Higgins
By
Glenn L Fish
Attorney Patented Aug. 3, 1943

2,325,955

UNITED STATES PATENT OFFICE 2,325,955

INSULATED MILK BOTTLE COVER

Thilda Higgins, Spokane, Wash.

Application August 5, 1941, Serial No. 405,547

1 Claim. (Cl. 229—89)

This invention relates to a milk bottle cover and has as one of its objects to provide a cover formed of insulating material and adapted to protect a bottle of milk from damage by heat or cold while being carried from a store to a person's abode or when resting on a porch after delivery by the driver of a milk wagon.

Another object of the invention is to provide an insulated milk bottle cover formed of sections movable into and out of position to fit about a milk bottle, improved latches being provided to hold the sections in bottle-enclosing position and there also being provided a handle which serves as a spring for yieldably holding the two sections closed.

Another object of the invention is to provide the sections with improved lugs or tongues which are firmly embedded in the sections and project inwardly therefrom for engaging under the bottom of a milk bottle and holding the bottle in the cover or casing when the casing is picked up by its handle and carried from one place to another.

Another object of the invention is to provide a cover which is simple in construction, easy to apply to a bottle, and formed of sections which are firmly held closed but may be easily released when a bottle is to be removed from the cover.

In the accompanying drawing:

Fig. 1 is a view showing a milk bottle cover or casing of the improved construction, in side elevation.

Fig. 2 is a sectional view taken vertically through the cover, a bottle in the cover being shown in elevation.

Fig. 3 is a transverse sectional view on the line 3—3 of Fig. 1.

Fig. 4 is a side elevation of a modified form of cover.

The improved casing or cover illustrated in Figs. 1, 2 and 3, consists of companion sections 1 and 2 formed of molded insulating material such as wood pulp or other suitable fibrous material having heat and cold insulating qualities. These sections are shaped to conform to the contour of a milk bottle 3 and are of such dimensions that the cover may be easily disposed about the bottle. The walls of the two sections are each semicircular in cross section, as shown in Fig. 3, and referring to this figure, it will be seen that the edge faces of the sections are beveled transversely so that edge faces of the section 2 overlap edge faces of the section 1 and prevent the sections from accidentally shifting transversely out of registering engagement with each other when closed. A handle 4 is provided at the closed top of the casing, the handle being formed of resilient metal and having its arms 5 formed with longitudinally curved anchoring portions 6 which are embedded in the headed upper ends of the sections and terminate in outwardly projecting tongues 7. This is clearly shown in Fig. 2, and referring to this figure, it will be seen that the arms of the handle will be firmly held in engagement with the sections and prevented from tearing loose when the handle is grasped and the casing, with a bottle of milk therein, carried by means of the handle. Since the handle is formed of resilient material, the sections may be shifted away from each other and the milk bottle 3 thrust upwardly into the casing through the open lower end of the casing. The two sections will then be moved toward each other to closed position by spring action of the resilient handle and the tongues 8 will engage under the bottle and prevent the bottle from dropping out of the casing.

Each of the tongues 8 consists of a strip of stiff metal which is bent midway its length to provide the tongue with an upwardly extending anchoring portion or shank 9 embedded in the lower portion of the casing section carrying the tongue. Since the tongues are formed of thin metal, the casing or cover may be disposed over a bottle with ends of the tongues bearing against sides of the bottle and, when the casing is forced downwardly, the tongues, by their engagement with the bottle, will cause the sections to be shifted away from each other and, when the tongues reach the bottom of the bottle they will move under the bottle as the resiliency of the handle causes the sections to be moved toward each other and return to a closed position about the bottle.

The casing sections 1 and 2 are to be releasably held closed and to accomplish this there have been provided latches 10. These latches are at opposite sides of the casing and mounted at lower ends of the sections. Each latch consists of metal strips 11 and 12 which are firmly secured against outer faces of the sections by rivets 13. The strip 11 has one end bent outwardly to form a lip 14 and the strip 12 has its free end portion bent to fold a diagonally extending bill 15 terminating in a curved lip 16 so that when the casing sections move toward each other, the bills may cover over the lips 14 and have interlocking engagement therewith. The sections of the casing will thus be firmly held in closed position and there will be no danger of their moving away from each other and allowing the bottle to drop out of the casing when said casing is lifted and carried by the handle 4. The material from which the casing sections are formed has sufficient resiliency to permit the section 1 to be flexed inwardly, as indicated by dotted lines in Fig. 3, when pressure is applied to the strips 11 and the casing sections may then be moved to open position and a bottle removed through the open lower end of the casing.

In Fig. 4 of the drawing, there has been illustrated a modified form of casing or cover to enclose and cover milk bottles set upon a porch or the like by the driver of a milk wagon. This cover 17 is formed of insulating material such as wood pulp, and may be of such dimensions that it will accommodate two milk bottles 18 instead of merely one, or any number of bottles desired. The cover is open at its bottom and tapers toward its upper end so that it will fit snugly about the bottles when placed over the same. At its upper end, there has been provided a handle 19 which is formed of metal and has its arms 29 bent to form outstanding feet 21 which are embedded in the top of the cover to firmly anchor the handle to the cover. By grasping this handle, the cover may be easily lifted when setting it in place over the bottles or when lifting the cover to remove the bottles. If desired, covers such as shown in Fig. 4, may be nested one within another when not in use or when being shipped, so as to conserve space.

Having thus described the invention, what is claimed is:

A bottle cover comprising a body of insulating material open at its bottom and closed at its top, said body consisting of vertical sections having side edge faces meeting in abutting engagement with each other along opposite sides of the body and diametrically across the top, a handle of resilient material disposed over the body diametrically thereof across meeting edges of the top-forming portions of the vertical sections and having depending arms at its ends, said arms having their lower portions firmly connected with the top-forming portions thereof sections to anchor the handle thereto whereby the handle serves as a spring yieldably holding the sections closed with their edge faces in engagement with each other and permitting the sections to be shifted away from each other for insertion and removal of a bottle through the open bottom of the cover, and means for releasably holding the sections in closed position.

THILDA HIGGINS.